April 15, 1924.

M. L. NORRIS

DYNAMO ELECTRIC MACHINE

Filed June 21, 1921

1,490,708

Inventor:
Marvin L. Norris,
by
His Attorney.

Patented Apr. 15, 1924.

1,490,708

UNITED STATES PATENT OFFICE.

MARVIN L. NORRIS, OF FORT WAYNE, INDIANA, ASSIGNOR TO GENERAL ELECTRIC COMPANY, A CORPORATION OF NEW YORK.

DYNAMO-ELECTRIC MACHINE.

Application filed June 21, 1921. Serial No. 479,409.

*To all whom it may concern:*

Be it known that I, MARVIN L. NORRIS, a citizen of the United States, residing at Fort Wayne, in the county of Allen, State of Indiana, have invented certain new and useful Improvements in Dynamo-Electric Machines, of which the following is a specification.

My invention relates to dynamo electric machines and has for its general object an improved construction and arrangement of parts which is efficient both electrically and mechanically and which is readily manufactured.

More particularly my invention relates to alternating current dynamo electric machines of the single phase commutator type which start as repulsion machines and run as induction machines.

In machines of this type it has been the practice generally to provide some form of switching device which is arranged to short circuit all of the secondary windings when the machine has come up to speed. To this end centrifugally operated switching devices have generally been employed; such devices as a rule having centrifugally actuated levers and pivoted parts partaking of motion of rotation about the pivots.

By my invention the use of all pivoted parts and levers are avoided. As a consequence the motions of the parts employed in my invention are reduced to the simplest terms comprising straight line motions only. To this end I employ a short circuiting device which moves axially of the rotor shaft into contact with the commutator to short circuit the rotor winding, the device being actuated by weights which have radial motion only relative to the rotor shaft.

Figure 1:
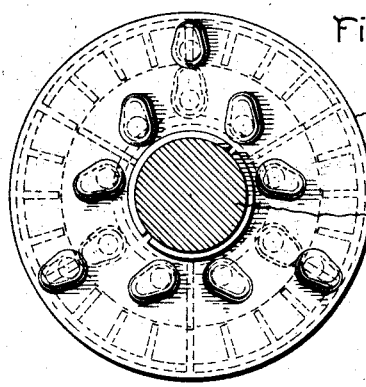
Figure 2:
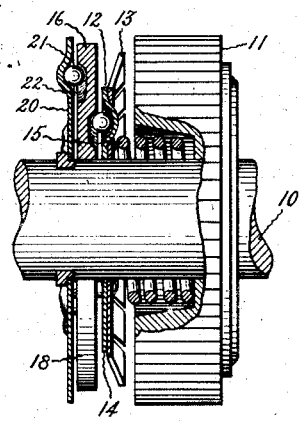
Figure 3:
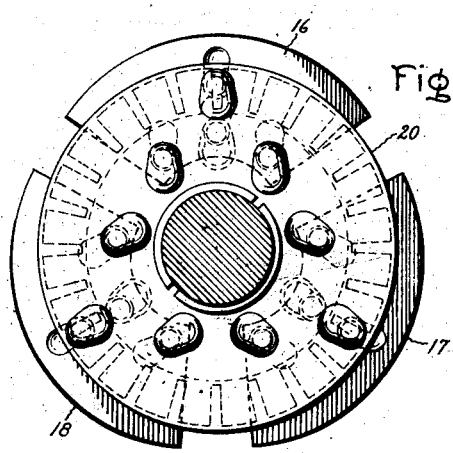
Figure 4:
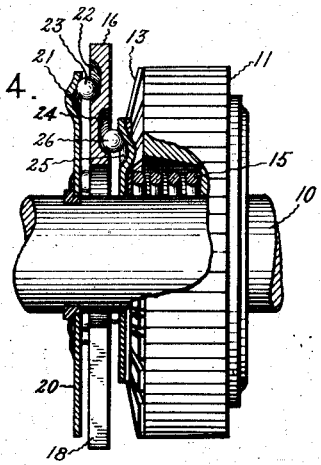
Figure 5:
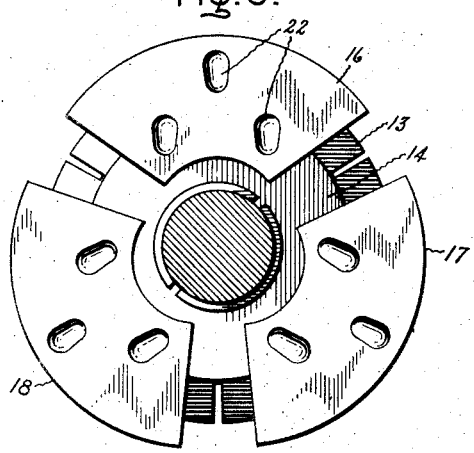
Figure 6:
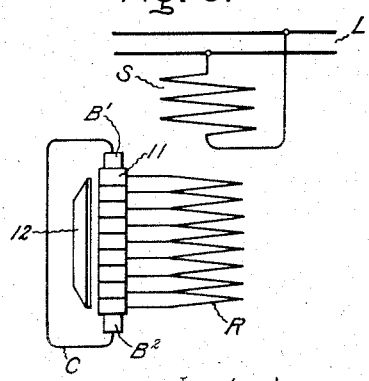

For a more complete understanding of the nature and objects of my invention reference should be had to the following detailed description taken in connection with the accompanying drawing in which:

Fig. 1 is an end view, and Fig. 2 a side view partly in section and partly in elevation of a shaft and commutator for dynamo electric machines equipped with my invention, the parts being in the position assumed when the machine is at rest. Figs. 3 and 4 are views similar to Figs. 1 and 2 but show the parts in the positions assumed when the machine has come up to speed. Fig. 5 shows a further detail of the moving parts; while Fig. 6 is an explanatory diagram.

Referring now to the drawing, 10 denotes the shaft of a dynamo electric machine which carries the commutator 11, the segments of which are insulated therefrom in any suitable manner.

Disposed on the shaft and arranged to move axially therealong is the short circuiting device 12 which comprises a conducting ring or member provided with a plurality of flexible fingers 13 arranged to engage with the ends of the commutator segments as shown in Fig. 4. To stiffen the conducting ring, however, a plate 14, of some strong material such as steel, is preferably secured thereagainst. This device as a whole moves against a spring or equivalent resilient element tending to maintain the short circuiting device in inoperative position. The spring is shown at 15 as surrounding the shaft and reacting against a portion of the spider carrying the commutator. (See the broken-away portions in Fig. 2.)

This axial movement of the device 12 against the spring 15 is caused by the radial movement of the three segmental weights 16, 17 and 18 disposed symmetrically about the shaft 10. The position of the weights 16, 17 and 18 about the shaft is fixed and guided by the annular abutment 20 made fast to the shaft and disposed on the other side of said weights from the short circuiting device 12.

In the face of the abutment 20 adjacent the weights 16, 17 and 18 are formations shown as cavities 21, there being three cavities in each weight. These cavities 21 register with the inner ends of similarly disposed formations or grooves 22 in the faces of the weights which are adjacent to the abutment 20. The middle groove 22 of the group on a weight is on a radius while those at each side thereof are parallel thereto. In each of the pockets formed by the registering of the cavities 21 with the grooves 22 are balls 23. Similarly in the other faces of each of the weights 16, 17 and 18 are the radial grooves 24 which are in register with cavities 25 formed in the adjacent face of plate 14. A ball 26 also resides in each of the pockets formed when grooves 24 and cavities 25 are in register.

The operation of my invention is as follows:

When the switches are closed so that current from the line L (see Fig. 6) traverses the stator winding S, current will be induced in the rotor winding R which will flow by way of the brushes B and the short circuiting connection C so that the machine starts as a repulsion motor.

As the machine, running as a repulsion motor, comes up to speed the weights 16, 17 and 18 move radially outward by the action of the centrifugal forces engendered by rotation. These weights accordingly move from their inner positions shown in Fig. 2 to their outer positions shown in Fig. 4, and by so doing cause the balls 23 and 26 to ride nearly out of their cavities 21 and 25 and thereby to exert a pressure upon the plate 14 which compresses the spring 15, translating as it were the radial movements of the weights 16, 17 and 18 into an axial movement which causes the device 12 thereafter to move against and short circuit the segments of the commutator 11. The winding R is now a short circuited secondary and the motor continues to run as an induction machine.

When the machine stops there is no longer any centrifugal force to keep weights 16, 17 and 18 in their outward position. The pressure of the spring 15 produces a cam action through the balls 23 and 26 to force the weights back to their inner position and at the same time to move the device 12 away from the commutator, so that the machine may again start as a repulsion motor when current is next turned on.

Having now described an embodiment of my invention which is at present the best means known to me for carrying the same into effect, I would have it understood that this is merely illustrative, and that I do not mean to be limited thereby to the precise details shown, nor restricted in the choice of recognized equivalents except as defined in my claims hereunto annexed.

What I claim as new and desire to secure by Letters Patent of the United States, is:—

1. In a dynamo electric machine, the combination with a rotor shaft, of a commutator thereon, a short circuiting device axially movable into and out of engagement with said commutator, a plurality of weights disposed about said shaft and adapted to move radially only relative to said shaft, an annular abutment on said shaft having cavities therein arranged to register with corresponding grooves in said weights, balls in said cavities, said short circuiting device and weights having similar cavities and grooves formed in their adjacent faces, balls in the pockets formed when said cavities and grooves are in register, and a resilient element reacting against said device.

2. In a dynamo electric machine, the combination with a rotor shaft, of a commutator thereon, a short circuiting device axially movable into and out of engagement with said commutator, a plurality of weights disposed about said shaft and adapted to move radially only relative to said shaft, a reinforcing plate fastened to said short circuiting device having cavities therein arranged to register with corresponding grooves in said weights, an annular abutment on said shaft having cavities arranged to register with corresponding grooves in said weights, balls in both sets of pockets formed when said grooves and cavities are in register, and a resilient element tending to maintain said short circuiting device in inoperative position.

3. In a dynamo electric machine, the combination with a rotor shaft, of a commutator thereon, a short circuiting device axially movable into and out of engagement with said commutator, a plurality of weights disposed about said shaft and adapted to move radially only relative to said shaft, said short circuiting device having cavities therein arranged to register with corresponding grooves in said weights, an annular abutment on said shaft disposed on the other side of said weights from said short circuiting device and having cavities therein arranged to register with corresponding grooves in said weights, balls in both sets of pockets formed when said cavities and grooves are in register, and a resilient element tending to maintain said short circuiting device in inoperative position.

4. In a dynamo electric machine, the combination with a rotor shaft, of a commutator thereon, a short circuiting device axially movable into and out of engagement with said commutator, a plurality of weights disposed about said shaft and adapted to move radially only relative to said shaft, each of said weights having grooves therein, the middle groove of each weight being arranged on a radius and the other grooves in each weight being parallel thereto, said short circuiting device having cavities therein arranged to register with the corresponding grooves in said weights, an annular abutment on said shaft having cavities therein arranged to register with the corresponding grooves in said weights, balls in both sets of pockets formed when said cavities and grooves are in register, and a resilient element tending to maintain said short circuiting device in inoperative position.

5. In a dynamo electric machine, the combination with a rotor shaft, of a commutator thereon, a short circuiting device axially movable into and out of engagement with said commutator, a plurality of weights disposed about said shaft and adapted to move radially only relative to said shaft, each of said weights having grooves therein, the middle groove of each weight being arranged on a radius and the other grooves in each weight being parallel thereto, a reinforcing plate fastened to said short circuiting device having cavities therein arranged to register with the corresponding grooves in said weights, an annular abutment on said shaft disposed on the other side of said weights from said short circuiting device, said abutment having cavities therein arranged to register with the corresponding grooves in said weights, balls in both sets of pockets formed when said cavities and grooves are in register, and a resilient element tending to maintain said short circuiting device in inoperative position.

6. The combination with a shaft adapted to rotate, of a member secured thereon, a device mounted on said shaft and arranged to move toward and from said member, a plurality of weights disposed about said shaft and adapted to move radially only relative to said shaft, an annular abutment on said shaft having cavities therein arranged to register with corresponding grooves in said weights, balls in said cavities, said device and weights having similar cavities and grooves formed in their adjacent faces, balls in the pockets formed when said cavities and grooves are in register, and a resilient element reacting against said device.

In witness whereof, I have hereunto set my hand this tenth day of June, 1921.

MARVIN L. NORRIS.